United States Patent [19]

Marrs et al.

[11] 4,052,219
[45] Oct. 4, 1977

[54] PIPE COATING COMPOSITION

[75] Inventors: Oren L. Marrs; Robert E. Reusser; Dale O. Tieszen, all of Bartlesville, Okla.

[73] Assignee: Phillips Petroleum Company, Bartlesville, Okla.

[21] Appl. No.: 680,836

[22] Filed: Apr. 28, 1976

[51] Int. Cl.² .................................... C09D 5/08
[52] U.S. Cl. ............................ 106/14; 106/281 R; 106/281 N; 106/282; 252/388; 427/388 R; 427/417
[58] Field of Search ............... 106/14, 281 R, 281 N, 106/282; 252/388

[56] References Cited

U.S. PATENT DOCUMENTS

| | | | |
|---|---|---|---|
| 1,988,628 | 1/1935 | McDonald et al. | 25/38 |
| 2,507,629 | 5/1950 | Gallagher | 106/282 |
| 3,470,006 | 9/1969 | Brunel | 106/281 R |
| 3,645,961 | 2/1972 | Goldfein | 106/99 |
| 3,898,204 | 8/1975 | Short et al. | 260/79 |

Primary Examiner—Lorenzo B. Hayes

[57] ABSTRACT

A pipe coating composition consisting essentially of a binder, mineral aggregates, a finely divided mineral filler and synthetic organic fibers exhibits improved cracking time as compared to a pipe coating composition containing glass fibers instead of the organic fiber.

5 Claims, No Drawings

PIPE COATING COMPOSITION

This invention relates to coating compositions. More specifically, this invention relates to a composition of matter useful as a protective pipe coating. Furthermore, this invention relates to a process of coating a pipe.

BACKGROUND OF THE INVENTION

Metal pipes are subjected to corrosion, particularly when they are laid in the ground or under water. It has been described in the art that such pipes can be protected from this corrosion by a protective coating of asphalt coated in turn with concrete. Such a coating not only renders the pipes heavy and is difficult to be put on the pipe joints, but the coating is not sufficiently flexible so that cracking may occur during the pipe laying.

An improved technique known in the art provides for a protective coating for pipes that comprises asphalt, sand, limestone dust and asbestos or glass fiber fillers. Whereas such a coating is reported to be more flexible than a concrete coating, it would be desirable to have a coating material available with still further improved crack resistance.

THE INVENTION

It is thus one object of this invention to provide a coating composition with good cracking resistance.

Another object of this invention is to provide a pipe coated with a protective layer with good crack resistance.

A further object of this invention is to provide a process for coating a pipe with a layer in order to reduce the corrosion of such a pipe when laid in the ground or under water.

These and other objects, details, advantages, embodiments and features of this invention will become apparent to those skilled in the art from the following detailed description of the invention and the appended claims.

In accordance with this invention, we have found that the incorporation of a synthetic organic fiber selected from the group consisting of polyester fibers, polyamide fibers, polyfluorocarbon fibers and poly(arylene sulfide) fibers into a coating composition based on asphalt and mineral aggregates improves the cracking resistance of such a coating as compared to the same coating containing glass fibers instead of the synthetic organic fibers defined above.

In one embodiment of this invention there is provided a composition of matter useful as a pipe coating which consist essentially of asphalt, a mineral aggregate, and a synthetic fiber selected from the group of polyester fibers, polyamide fibers, polyfluorocarbon fibers and poly(arylene sulfide) fibers.

The usually employed weight percentage ranges for these four ingredients, as well as the preferred ranges, are shown in the following table:

TABLE I

| Ingredient | Weight percent Usually employed range | Preferred range |
| --- | --- | --- |
| Mineral aggregate | 50–70 | 55–65 |
| Finely divided mineral filler | 15–35 | 20–30 |
| Asphalt | 5–20 | 10–15 |
| Synthetic organic fiber | 0.05–0.5 | 0.1–0.5 |

A mastic with desirable crack resistance properties is obtained by thoroughly admixing the ingredients within the weight percentage ranges shown above.

An important ingredient in the composition or mastic of this invention is the synthetic organic fiber. This fiber is selected from the group of fibers consisting of polyester fibers, polyamide fibers, polyfluorocarbon fibers, poly(arylene sulfide) fibers and mixtures thereof. Such fibers are not present in the composition as a supporting web, fabric or tape, but rather are incorporated into the mastic or composition as a filler material. Although only a small weight percentage (0.05 to 0.5 weight percent) of the synthetic organic fiber is used, the fiber has a strong influence on the cracking properties of the coating.

Examples for polyester fibers are poly(ethylene terephthalate) fibers and poly(1,4-cyclohexanemethylene terephthalate) fibers. Useful polyamide fibers include nylon fibers, such as fibers made of nylon-6 and nylon-6,6. Other useful polyamides are polyamides from bis(p-aminocyclohexyl)-methane and azelaic acid and polyamides from m-phenylenediamine and isophthalic acid. Examples for useful polyfluorocarbon fibers are poly(tetrafluoroethylene) fibers and fibers from fluorinated ethylene-propylene copolymers. Useful poly(arylene sulfide) fibers are, for example, poly(p-phenylene sulfide) fibers. The poly(arylene sulfide) fibers are the preferred synthetic organic fibers in the composition of this invention. These poly(p-phenylene sulfide) fibers are described in detail in the U.S. Pat. Nos. 3,895,091, 3,898,204 and 3,919,177.

The synthetic organic fibers can be incorporated into the composition of this invention in a wide variety of sizes. The synthetic organic fibers can be used either as monofilament fibers or as multifilament yarns. For example, the fibers can be introduced into the composition of this invention in strands of about 10 to about 100 monofilaments. It is generally convenient to use the fibers in lengths of about 1 to 15 millimeters and to utilize fibers that are further characterized by having a weight of about 1 to 16 denier. (The denier value refers to the weight of 9,000 meters of the respective fiber monofilament in grams.)

The mineral aggregates, which are useful as the most plentiful ingredient in the composition of this invention, include small crushed rock, gravel and sand. Any size distribution of the aggregate particles which gives a pipeline coating with desired characteristics is within the scope of this invention. In order to obtain a particularly useful density, flexural strength, and crack resistance of the coating, it is currently preferred to employ sand which has a particle size distribution such that the sand passes through a screen of about 6 mesh and is retained on a screen of about 100 mesh. Generally about 50 to 90 wt. % of the sand is retained on a 30 mesh screen and that from about 10 to 50 wt. % of the sand passes through a 30 mesh screen and is retained on a 100 mesh screen. The mesh numbers refer to the U.S. Standard Sieve Series.

The finely divided mineral filler preferably is a material selected from the group consisting of limestone dust, portland cement, talc and kaolin. It is presently preferred to use limestone dust. The preferred particle size distribution of the finely divided mineral filler, particularly of the limestone dust, is such that about 10 to 50 wt. % of the filler passes through a 100 mesh screen and is retained on a 200 mesh screen, that 45 to 85 wt. % of the filler passes through a 10 mesh screen and is retained on 100 mesh screen, and that 0 to 10 wt. % of the filler is retained on a 10 mesh screen.

The asphalts that can be used in the composition of this invention include conventional petroleum asphalts and air-blown asphalts. The asphalts can be characterized by having penetration grades of up to 250 as measured by ASTM method D5. The currently preferred asphalt is an air-blown asphalt of approximately 5 to 25 penetration grade.

In accordance with another embodiment of this invention, there is provided a pipe coated with a layer of protective mastic as defined above. The ingredients, the usually employed and preferred ranges for the ingredients in the mastic layer are the same as defined above.

The pipe coated can be any pipe that is usually exposed to corrosion. The preferred pipes are steel pipes. Generally the external diameter of these steel pipes is about 2 to about 48 inches (5–125 cm) and their wall thickness is about 1/16 to about 2 inches (1.6–51 mm). The thickness of the mastic coating on the pipe can vary in broad ranges. Generally the thickness of the coating will increase with increasing pipe diameter. Usually a good protection of the pipe is obtained if the coating on the external surface of the pipe is about 0.5 to 40 millimeters thick.

Yet another embodiment of this invention consists in a process for producing a coated pipe. In this process the composition defined above is utilized at elevated temperatures that are below the melting point of the synthetic organic fiber, and the composition is applied to the pipe in the desired thickness. The mastic itself is preferably prepared shortly before the application thereof on the pipe by thoroughly admixing the ingredients. Currently it is preferred to blend a mixture of the mineral aggregates, the finely divided mineral filler, and the synthetic organic fibers. This mixture is then utilized at a temperature of 175° to 260° C and blended with asphalt having approximately the same temperature as this mixture. The blending of the ingredients can be done in any means well known in the art. For example, pugmills are useful for preparing the mastic of this invention. After this thorough blending of the ingredients, the hot mastic is applied to the exterior surface of the pipe to be coated by techniques well known in the art. The total layer of mastic applied to the exterior of the pipe will generally have a thickness of about 0.5 to about 40 millimeters.

In some instances it is desirable to apply a primer coat of asphalt to the exterior of the pipe prior to the application of the mastic. This is done in order to strengthen the bond between the pipe and the mastic. For application of such a primer coat, the asphalt is heated to a temperature of 170° to 260° C and the sufficiently fluid asphalt material is applied by a standard technique to the exterior of the pipe. Another way of applying the asphalt is to use a cut back asphalt and subsequently evaporate the solvent. The primer coating will usually have a thickness of about 0.05 to 1 millimeter. After the primer coating has been applied, the mastic of this invention is applied on top. This is preferably done while the primer coating has not yet completely hardened, in other words while the primer coating is still soft. Thereby a strong bond between the protective coating of this invention and the pipe is achieved.

The invention will be more fully understood from the following example that is intended to illustrate preferred embodiments of this invention but not to limit the scope thereof.

EXAMPLE

Various mastic compositions were prepared in accordance with the following recipe.

| Component | Parts by weight |
|---|---|
| Sand | 81.4 |
| Limestone dust | 38.6 |
| Synthetic organic fiber | Variable |
| Asphalt[a] | 16.6 |

[a]Type II asphalt (air-blown), 15–17 penetration grade.
The sand employed in this mixture had a particle size distribution shown in the following table.

| Screen Size, Mesh | | |
|---|---|---|
| Passing Through | Retained on | Weight Percent |
| 6 | 8 | 29 |
| 8 | 16 | 36 |
| 16 | 30 | 19 |
| 30 | 50 | 9 |
| 50 | 100 | 7 |

The limestone dust employed in the preparation of the mastics of this example had the following particle size distribution.

| Screen Size, Mesh | | |
|---|---|---|
| Passing Through | Retained on | Weight Percent |
|  | 10 | 10 |
| 10 | 20 | 10 |
| 20 | 50 | 30 |
| 50 | 60 | 0 |
| 60 | 100 | 25 |
| 100 |  | 25 |

The sand, limestone dust and fibers were blended together at room temperature (24° C) with vigorous mixing. The asphalt and the sand-limestone-fiber blend were heated separately in air to a temperature of 205° C. The hot, sand-limestone-fiber blend was poured into the container of hot asphalt and mixed thoroughly by hand stirring. After sufficient stirring to obtain a mixture of uniform consistency, the mastics were heated to 205° C and placed in a rectangular mold 25 mm × 152 mm × 6.3 mm, which was preheated to a temperature of 190° C. Following the application of a pressure of 2,000 psi (13,790 kPa) to the mastics for 5 minutes, the mold was cooled quickly by circulation of cold water around it, and the cooled mastics were removed from the mold in the form of bars. These bars were tested and the results obtained are shown in the following table.

TABLE

| Run No. | Fiber | Part by Weight | Weight Percent | Crack Time, Sec. (a) | Flex. Str. psi (b) | Flex. Mod. lb/in (b) | Deflection Max. in. (c) |
|---|---|---|---|---|---|---|---|
| 1 | None | — | — | 31.4 | 961 | 38,937 | 0.061 |
| 2 | Glass (d) | 0.26 | 0.19 | 32.0 | 921 | 41,207 | 0.050 |
| 3 | " | 0.68 | 0.50 | 34.7 | 976 | 40,852 | 0.055 |
| 4 | " | 1.36 | 1.0 | 45.4 | 1057 | 40,990 | 0.048 |
| 5 | PPS (e) | 0.26 | 0.19 | 42.9 | 954 | 33,332 | 0.068 |
| 6 | " | 0.26 | 0.19 | 44.9 | 971 | 34,182 | 0.059 |
| 7 | " | 0.68 | 0.50 | 37.4 | 931 | 26,719 | 0.073 |
| 8 | Polyester (f) | 0.26 | 0.19 | 43.4 | 932 | 33,915 | 0.056 |

TABLE-continued

| Run No. | Fiber | Part by Weight | Weight Percent | Crack Time, Sec. (a) | Flex. Str. psi (b) | Flex. Mod. lb/in (b) | Deflection Max. in. (c) |
|---|---|---|---|---|---|---|---|
| 9 | " | 0.26 | 0.19 | 36.2 | 1014 | 32,659 | 0.044 |
| 10 | Polyfluoro-carbon (g) | 0.26 | 0.19 | 36.9 | 965 | 36,212 | 0.056 |
| 11 | Polyamide (h) | 0.26 | 0.19 | 43.8 | 968 | 37,247 | 0.054 |

(a) Determined on Instron testing machine by placing molded bars on supports 10.2 cm apart and applying a load to the center of the test piece using a 19 mm diameter mandrel at a rate of 0.5 cm/min. Time in seconds to initial crack formation is recorded as crack time.
(b) Ultimate flexural strength determined from stress-strain curve obtained in crack time test (a) using formulas outlined in ASTM D-790.
(c) Deflection at maximum load was determined from stress-strain curve obtained in crack time test (a) using known cross-head speed (0.5 cm/min) and known chart speed (2 in/min) using the formula:
Deflection = a/16 × 0.1 × d/0.25
wherein a is the horizontal distance on the chart in sixteenths of an inch from the origin to the point of maximum peak height and d is the thickness of the bar in inches (measured to thousandths of an inch).
(d) Owen-Corning Fiber Glass, product code JTX-7048, ¼-inch-long strands.
(e) Poly(p-phenylene sulfide) fibers, 7.5 denier/filament, 60 filaments/strand, ¼-inch-long strands.
(f) Fortrel polyester-poly(ethylene terephthalate) - Celanese, ¼-inch-long strands.
(g) Teflon fiber - poly(tetrafluoroethylene) - Dupont, ¼-inch-long strands.
(h) Nomex fiber - poly(meta-phenylene isophthalamide) - Dupont, ¼-inch-long strands.

The data shown in the table indicate that the crack resistance for the mastics of this invention as shown by the higher crack times (Runs 5 to 11), are improved over those of prior art mastics of Runs 1 to 4, in which no fiber or glass fibers are used instead of the synthetic organic fibers used in accordance with this invention. Since crack resistance is an important property for the pipeline coatings, the mastics of this invention can be applied to pipes as explained above resulting in coated pipes, the coating of which has improved crack resistance.

Reasonable variations and modifications, which will become apparent to those skilled in the art, can be made in this invention without departing from the spirit and scope thereof.

We claim:

1. A composition of matter consisting essentially of a mixture of about 50 to 70 wt. % of a mineral aggregate,
about 5 to 20 wt. % of asphalt,
about 15 to 35 wt. % of a finely divided mineral filler, and
about 0.05 to 0.5 wt. % of a synthetic organic fiber selected from the group consisting of polyester fibers, polyamide fibers, polyfluorocarbon fibers and poly(arylene sulfide) fibers.

2. A composition in accordance with claim 1 wherein the mineral aggregate is sand.

3. A composition in accordance with claim 1 wherein said finely divided mineral filler is limestone.

4. A composition in accordance with claim 1 wherein said organic synthetic fiber is a poly(p-phenylene sulfide) fiber.

5. A composition in accordance with claim 1 wherein said synthetic organic fiber has a length of about 1 to about 15 mm and fiber weight of about 1 to 16 denier.

* * * * *